UNITED STATES PATENT OFFICE.

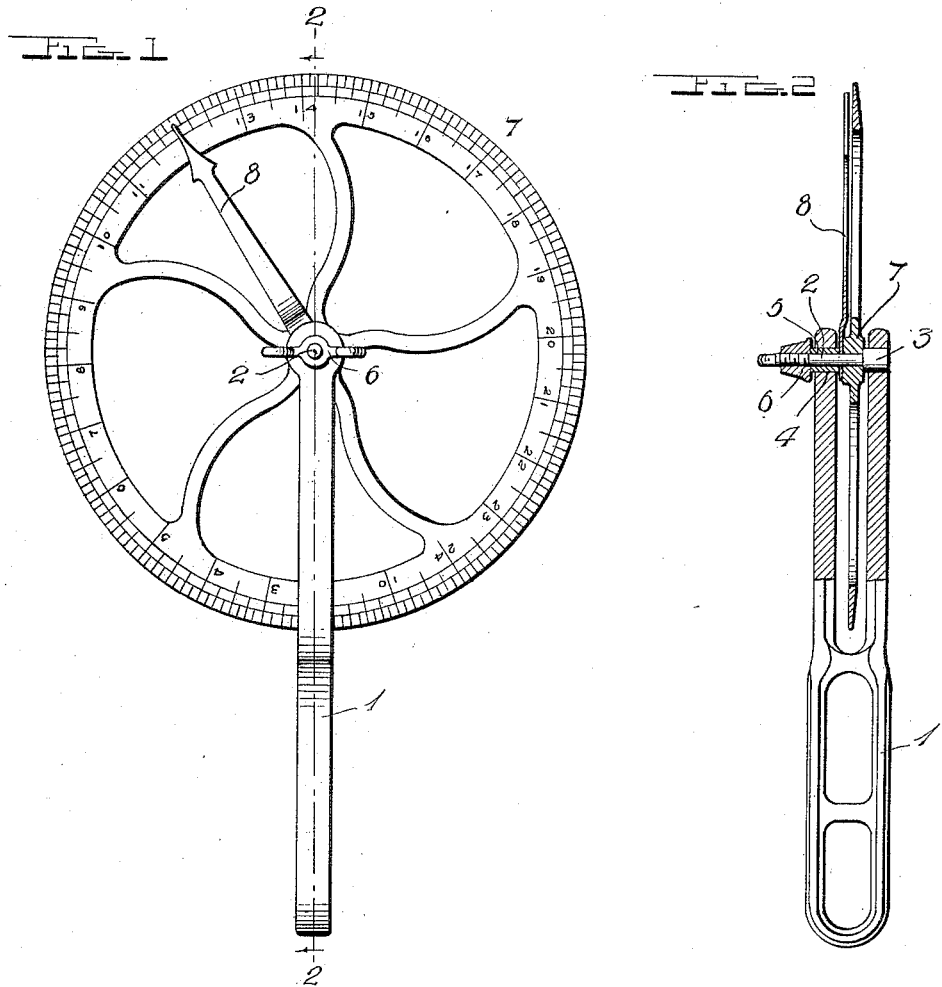

FREDERICK W. RAPSON, OF BAD AXE, MICHIGAN.

MEASURING-WHEEL.

1,078,462.  Specification of Letters Patent.  Patented Nov. 11, 1913.

Application filed November 11, 1912. Serial No. 730,768.

*To all whom it may concern:*

Be it known that I, FREDERICK W. RAPSON, a citizen of the United States, residing at Bad Axe, in the county of Huron and State of Michigan, have invented certain new and useful Improvements in Measuring-Wheels; and I do declare the following to be a full, clear, and exact description of the invention, such as will enable others skilled in the art to which it appertains to make and use the same.

This invention relates to improvements in measuring wheels.

One object of the invention is to provide a measuring wheel having an improved construction and arrangement of indicating hand or pointer and means for fastening the latter in adjusted positions on the wheel.

Another object is to provide a wheel of this character which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings; Figure 1 is a plan view of my improved measuring wheel; Fig. 2 is a central longitudinal section thereof taken on the line 2—2 of Fig. 1; Fig. 3 is an outer end view of the measuring wheel.

My improved measuring wheel comprises a handle 1 having a bifurcated outer end in the extremities of which is secured a transverse supporting shaft 2 having on one end a head 3 engaged with one of the arms of the bifurcated handle and having its opposite end threaded and projecting a suitable distance beyond the outer side of the opposite arm of the handle as clearly shown in Fig. 2 of the drawing. Loosely mounted on the threaded end of the shaft and engaged with the aperture 4 in the end of the arm of the handle through which the threaded end of the shaft passes is a cylindrical clamping sleeve 5 with the outer end of which is engaged a clamping nut 6 which is screwed onto the threaded end of the shaft 2 as shown.

Revolubly mounted on the shaft 2 adjacent to the head 3 thereon is a gage wheel 7 which may be of the usual or any suitable construction and which has one side or face perfectly flat and the outer portion of the opposite side preferably beveled or tapered toward the edge of the wheel as shown. Loosely engaged with the shaft 2 between the inner end of the clamping sleeve 5 and the adjacent side of the hub of the wheel is a pointer or indicating finger 8 the outer portion of which is preferably bent inwardly or offset from the shaft engaging portion to bring said outer portion of the hand in close relation to the flat side of the wheel. When thus arranged the outer end of the pointer or finger 8 is adapted to co-act with the scale of measurement on the flat side of the wheel adjacent to its outer edge.

In using my improved wheel the same is operated in the usual manner for obtaining the length or circumference of the object to be measured. After the object has been measured in the usual manner the pointer or finger is adjusted to the division marks on the scale of the wheel which come opposite to the end of the object or to the starting point on the circumference of the object being measured so that in transferring the measurement of this object to another object the point at which the last revolution of the wheel should be stopped will be positively indicated on the wheel by the pointer thereby obviating any danger of the wrong measurement being transferred through forgetfulness or carelessness on the part of the operator and obviating the use of chalk or other means for marking the point where the measurement of the object terminates.

In order to adjust the pointer to the desired position on the wheel it is simply necessary to unscrew the clamping nut 6 to a very slight extent thereby loosening the clamping sleeve 5 which will release the pointer and permit the same to be turned to any position on the wheel after which the nut 6 is again tightened on the shaft 2 thus forcing the sleeve 5 inwardly and clamping the inner end of the hand between the inner end of the sleeve and the adjacent side of the hub of the wheel.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A measuring wheel comprising a handle having a bifurcated end, a wheel supporting shaft engaged with said bifurcated end of the handle and having on one end an enlarged head and its opposite end threaded and projecting beyond one side of the handle, a gage wheel revolubly mounted on said shaft adjacent to the headed end thereof, a clamping sleeve arranged on the threaded end of the shaft and engaged with one arm of said bifurcated end of the handle, a clamping nut having a threaded engagement with the threaded end of the shaft, and an operative engagement with the outer end of said clamping sleeve, and a pointer loosely mounted on said shaft between the inner end of said clamping sleeve and the hub of the wheel whereby when said clamping sleeve is forced inwardly by said nut, said pointer will be clamped between the inner end of the sleeve and the hub of the wheel and thereby fastened in its adjusted position.

In testimony whereof I have hereunto set my hand in presence of two subscribing witnesses.

FREDERICK W. RAPSON.

Witnesses:
  ROBERT O. RAPSON,
  JOHN L. CLARACY.

Copies of this patent may be obtained for five cents each, by addressing the "Commissioner of Patents, Washington, D. C."